Nov. 18, 1958    J. R. MILES    2,860,543
PROJECTOR
Filed June 21, 1956    6 Sheets-Sheet 3
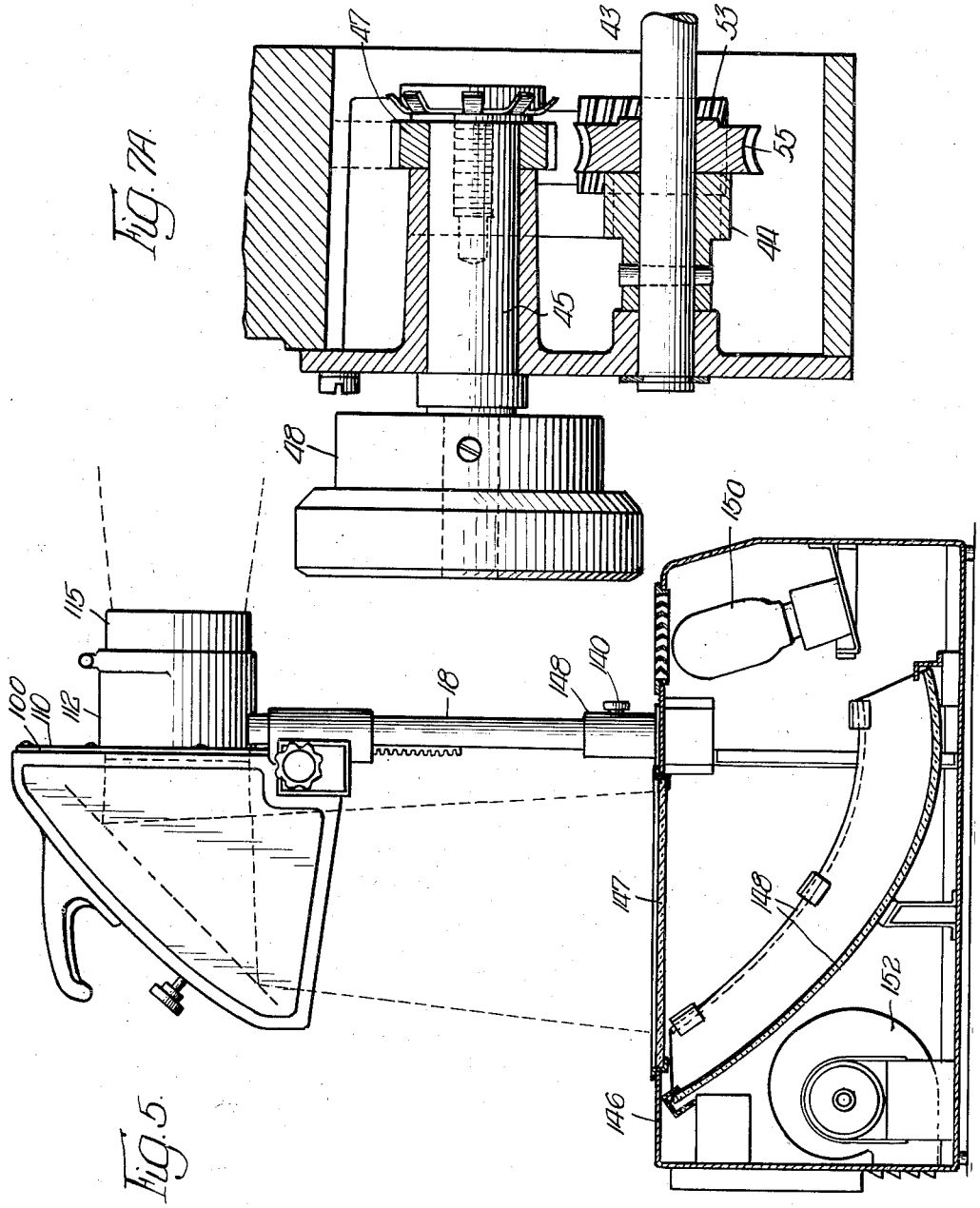
INVENTOR.
John R. Miles,
BY Wilkinson, Huxley,
Byron & Hume
Attys.

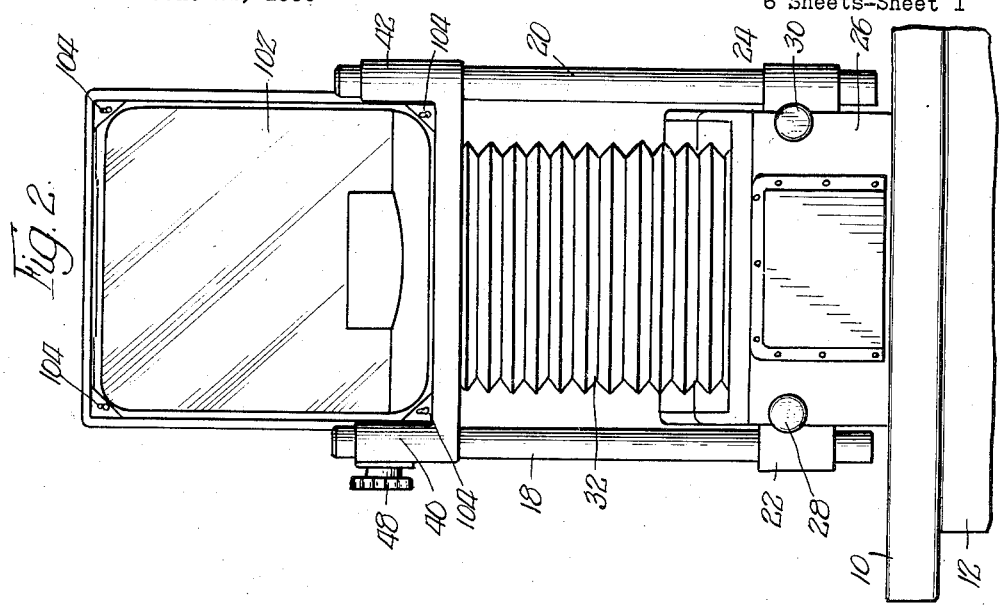
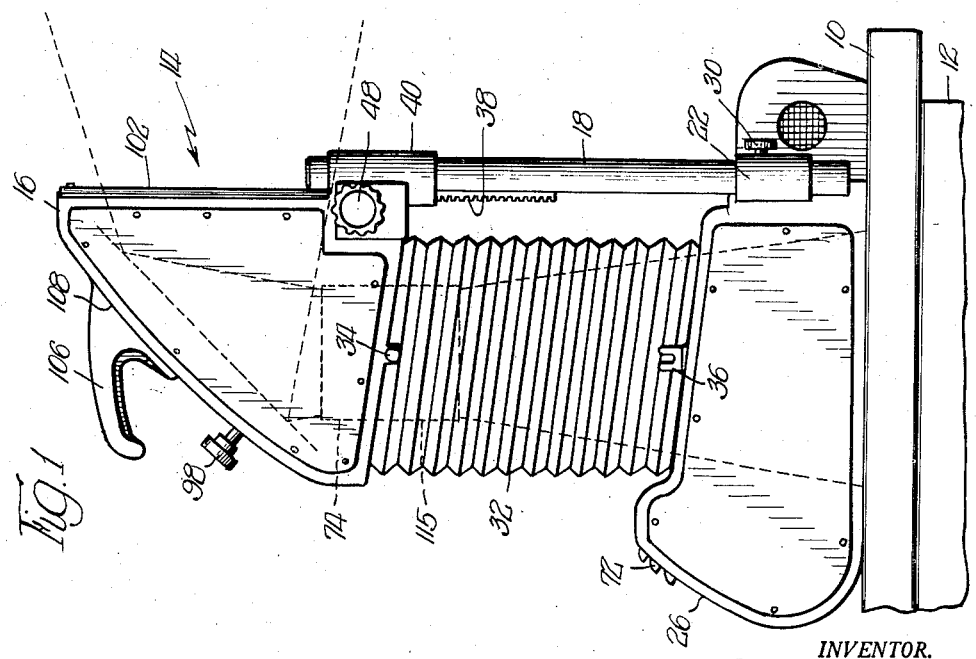

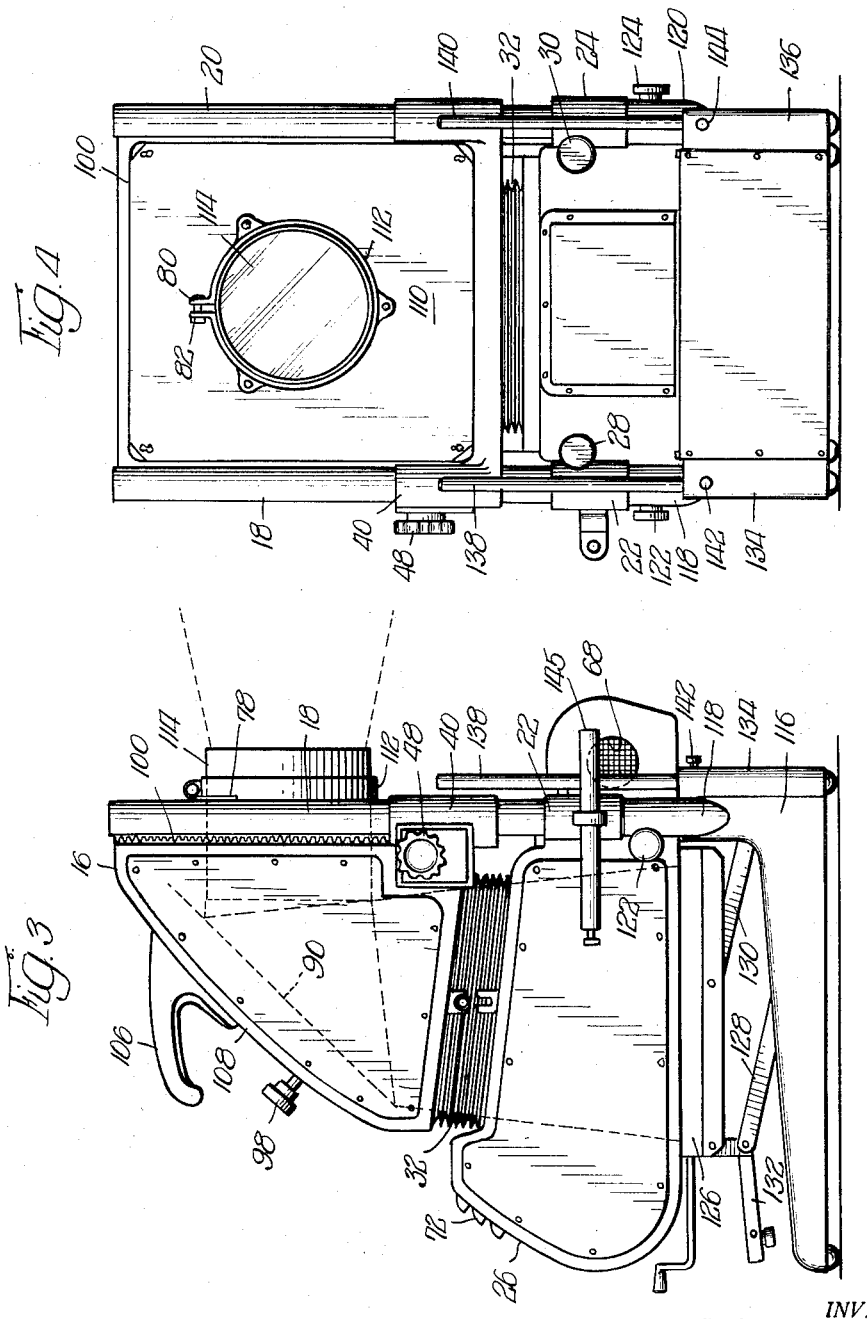

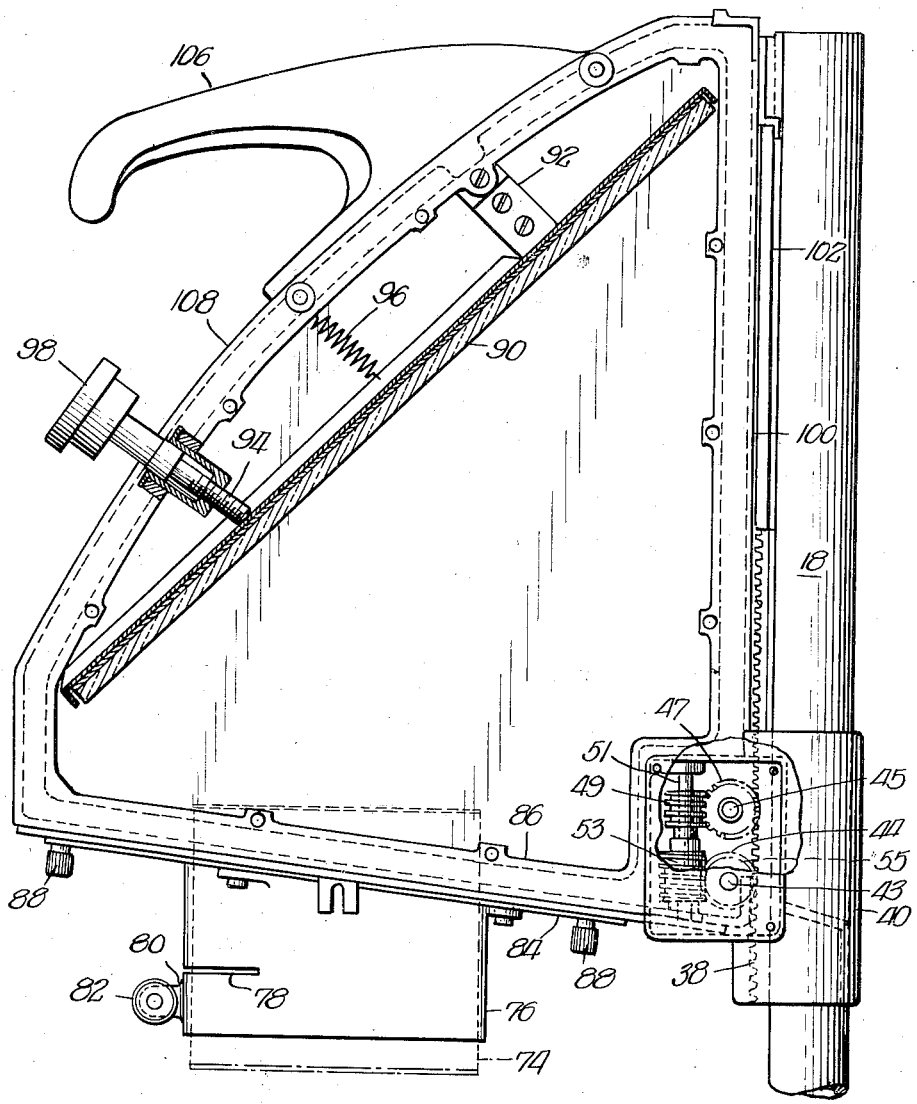

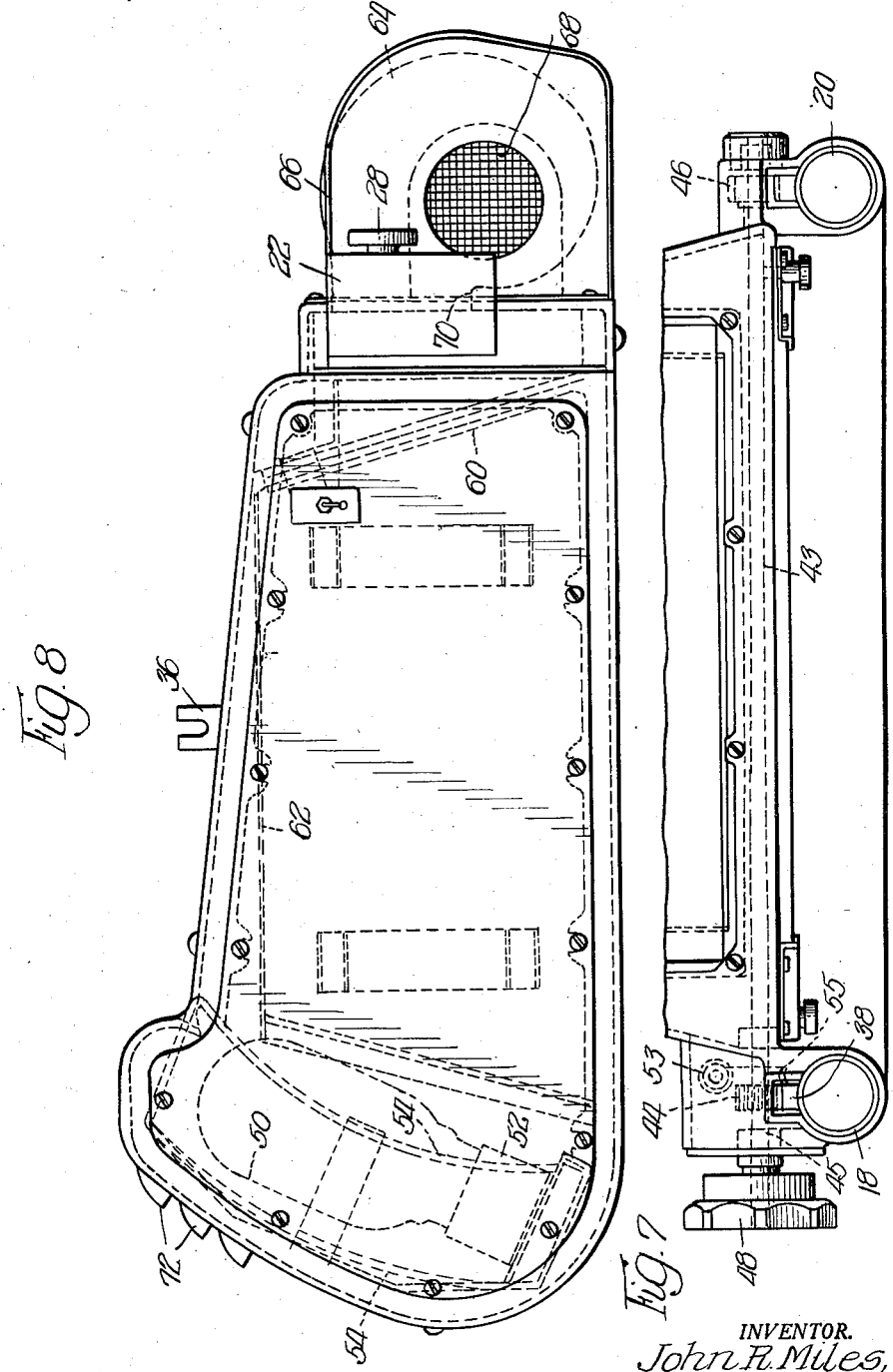

Nov. 18, 1958  J. R. MILES  2,860,543
PROJECTOR
Filed June 21, 1956  6 Sheets-Sheet 6

INVENTOR.
John R. Miles,
BY Wilkinson, Huxley,
Byron & Hume
Attys.

United States Patent Office
2,860,543
Patented Nov. 18, 1958

2,860,543
PROJECTOR

John R. Miles, Skokie, Ill., assignor to Projection Optics Co. Inc., Rochester, N. Y., a corporation of New York Application June 21, 1956, Serial No. 592,894

4 Claims. (Cl. 88—26)

This invention relates to a projector and more particularly to a device which is adapted to project images of both opaque and transparent objects.

For the projection of opaque objects, such as books or the like, the projector is adapted to be utilized with a lift base, whereas for large flat objects, such as maps or the like, the projector may be placed directly on the object supported by a table or like surface.

A novel form of projector head forms a part of the invention which head is adapted to be utilized with a light box and bellows assembly designed for use with opaque objects, or with an alternative form of light box designed for use with transparent objects.

It is therefore an object of this invention to provide a projector which is adapted to project images of a wide range of sizes of either opaque or transparent objects.

It is also an object to provide a projector capable of utilizing lenses of a wide range of focal lengths so that the device is equally operable in a small room or a large hall.

Still another object of this invention is to provide a projector of the character described which is relatively simple in construction and operation and which requires a minimum of maintenance and repair.

Further objects and advantages of this invention will become evident as the description proceeds and from an examination of the accompanying drawing which illustrates one embodiment of the invention and in which similar numerals refer to similar parts through the several views.

In the drawings:

Figure 1 is a view in side elevation of a projector embodying the invention set up for the projection of the image of flat opaque objects such as maps, blueprints, plans, etc. which are adapted to be supported by a flat surface such as table top.

Figure 2 is a view in front elevation of the projector shown in Figure 1.

Figure 3 is a view in side elevation of the projector shown in Figure 1 disposed in association with a supporting base particularly adapted for use in the projection of images of books and other opaque objects, with a different lens arrangement being provided in the projector head.

Figure 4 is a view in front elevation of the projector shown in Figure 3.

Figure 5 is a view in side elevation of a projector incorporating the invention using an alternate form of light box for the projection of transparent objects such as photographic film or glass plates.

Figure 6 is a view in vertical section of the projection head shown in Figure 1.

Figure 7 is a plan view from above of a fragmentary portion of the projection head shown in Figure 4.

Figure 9:
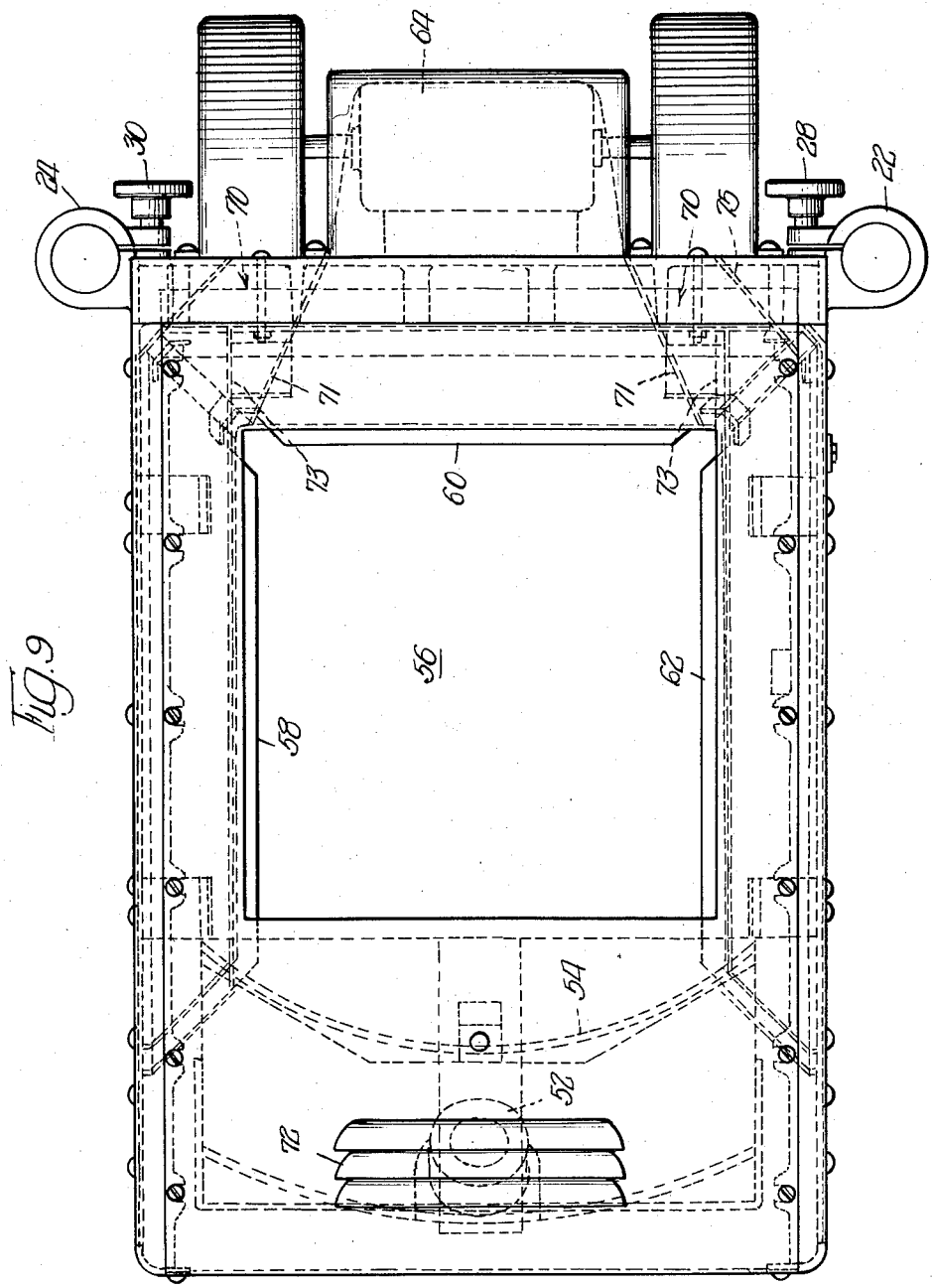

Figure 7–A is a fragmentary view in elevation and partly in vertical section of a portion of the mechanism shown in Figure 7.

Figure 8 is a view in side elevation of the light box incorporated in the form of projector shown in Figures 1 to 4.

Figure 9 is a plan view from above of the light box shown in Figure 8.

Referring now to Figures 1 and 2, a projector is shown therein embodying the invention in a form which is particularly adapted for use in projecting the image of flat, opaque objects such as maps, blueprints or the like, supported on the upper surface 10 of a supporting table 12. The projector, indicated generally by the numeral 14, may be placed directly on the object so that an image of a portion thereof lying directly under the projector will be projected onto a suitable screen or like surface, through the projection head 16. This projection head is adjustably supported by two focus tubes 18 and 20. Each of these tubes is secured in the ring clamps 22 and 24 respectively, which ring clamps are fixed to the two front corners of the opaque light box 26. The two knobs 28 and 30 are provided for operating the two ring clamps 22 and 24, respectively.

A bellows 32 extends from the base of the projector head 16 into association with the upper side of the opaque light box 26. Suitable fastening members 34 and 36 are provided for removably securing the upper and lower ends of the bellows of the projection head and to the opaque light box, respectively.

As best shown in Figure 1, the upper ends of the focus tubes 18 and 20 are provided with a rack 38. The upper end of each focus tube is adapted to be received in one of the sleeves 40 and 42. As shown in detail in Figures 6, 7 and 7–A, a shaft 43 is provided with pinions 44 and 46 secured thereto, the shaft 43 being rotatable by rotation of the knob 48. These pinions 44 and 46 form a part of a drive mechanism on each side of the projection head and permit the projection head 16 to be moved longitudinally of the focus tubes 18 and 20 by rotation of the knob 48. This provides a means of varying the distance between the projector head 16 and the opaque light box 26 as desired to obtain the proper focus.

More specifically, the knob 48 as best shown in Figure 7–A is secured to the shaft 45 which carries a helical gear 47 adapted to mesh with the helical gear 49 on the shaft 51 as shown in Figure 6. The lower end of the shaft 51 carries the worm 53 which is adapted to mesh with the worm gear 55 secured to the shaft 43. With this arrangement, as previously mentioned, rotation of the knob 48 will cause the shaft 43 to rotate and turn the pinions 44 and 46 which mesh with the racks 38 on the focus tubes 18 and 20, respectively. A non-reversible worm drive is therefore provided which permits the projection head to be disposed in any selected position of adjustment along the focus tubes, without the necessity of clamping action.

The opaque light box is provided with a light source, such as the thousand watt bulb 50 shown in dotted lines in Figure 8. This bulb is mounted in a base 52 and has a concave reflector 54 mounted behind it. As shown in Figures 8 and 9, an opening 56 is provided in the bottom of the opaque light box of a suitable size, for example, 11 inches by 11 inches. This opening is surrounded on the three sides farthest from the bulb 50 by mirrors 58, 60 and 62 each of which slants inwardly at the top so that light is directed downwardly onto the object disposed in the opening 56. A blower 64 is provided in a suitable housing 66 at each side of the end of the light box opposite to the bulb member 50. These are adapted to draw in cool air through the openings 68 and force it through the openings 70 down toward the opening 56, in order to keep the object being imaged cool. The brackets 71 serve to mount the mirror 60 and also as air deflectors to direct the cooling air through the openings 70 between the side edges of the mirror 60 and the extended brackets 73 which support the mirrors 58 and 62. An additional deflector 75 is provided in the corner of the housing. This cooling air, after passing over the object being imaged, passes out of the opaque light box through suitable louvers 72 disposed above the bulb 50 in the end of the housing associated with that bulb.

The portion of the box associated with the lower end of the bellows 32 is open so that light can pass up through the bellows 32 to the lens 74 shown in dotted lines in Figure 1 and in more detail in Figure 6. The lens 74 is mounted adjustably in a tubular clamping flange 76 having a slot 78 formed therein adjacent the lower edge. The portion defined by the slot 78 and the lower edge has a vertical slot formed therein with ears 80 disposed on each side thereof. A suitable clamping means 82 is provided to draw these ears 80, and therefore the two portions of the flange on each side of the vertical slot, together to securely clamp the lens 74 in the selected position of adjustment.

The lens flange 76 has its upper end secured to a lens board 84 which is in turn adapted to be secured to the frame 86 of the projection head by suitable retaining members 88. The projection head in the form shown is generally triangular in vertical section and is provided with a plane first surface mirror 90 mounted above the lens flange 76 at substantially a 45° angle to the axis of the lens. The mirror 90 has one end pivotally mounted on the bracket 92 and has its opposite end retained in abutment with the adjustable screw member 94 by the spring 96. Through this arrangement the angle of disposition of the mirror 90 may be adjusted by turning the knob member 98 on the screw member 94. This tilting of the mirror 90 will cause the image to be displaced slightly on the screen as desired.

As shown in Figures 3, 4 and 5, the projection head 16 is adapted to have the lens secured in the position shown in Figures 1 and 6 or, alternatively, in association with the front side 100. In the absence of the lens, this side is adapted to have a glass plate 102 secured thereto by the retaining members 104 disposed at each corner thereof, as best shown in Figure 2. When the lens is to be secured to the side 100, as best shown in Figures 4 and 5, a suitable lens board 110 is provided in place of the glass plate 102, shown in Figure 6. This lens board has secured thereto a lens receiving flange 112 generally similar to the flange 76 previously described. This flange 112 is adapted to adjustably receive and support a lens 114. When such an arrangement is utilized, the lens board 84 and its associated flange 76 and lens 74 is, of course, removed. Such an arrangement provides substantial versatility as to focal length with respect to the projector. As a matter of fact, lenses can be used, for example, having a one inch focal length or less on up to a 60 inch focal length, as desired. This overcomes a substantial limitation of previous forms of projectors, namely their lack of ability to utilize lenses of differing focal lengths so that both small room and large hall operations were not possible with the same device as is the case in the present invention. The lens 115, shown in Figure 1, is representative of a relatively short focal length lens while the lens 114, shown in Figures 3 and 5 is illustrative of a lens of relatively long focal length. This versatility can be extended even further by using lens boards (or adaptors for those already described) which permit the lens to be mounted farther from the frame of the projection head than does the board 110. A lens board with substantially the configuration of a truncated pyramid may be used, for example.

A handle member 106 is provided on the upper surface 108 of the projection head 16 which handle provides a means of lifting the entire assembly shown in Figures 1 and 2 so that the position of the projector on the material being projected can be readily changed, or new material may be inserted thereunder.

Referring again to Figures 3 and 4, the projector is shown therein with the entire assembly disposed in association with a base member 116, which arrangement is particularly suited for the projection of books, letters and the like. The bases of the focus tubes 18 and 20 have been inserted in the bosses 118 and 120, respectively, on the base member 116 and have been clamped therein by operation of clamping knobs 122 and 124. When so arranged, all three units, namely the projection head 16, the opaque light box 26 and the base member 116, are all secured in spaced relation one to another on the focus tubes 18 and 20. The projection head has been lowered substantially from the position shown in Figure 1 so that the bellows 32 is completely collapsed.

The base member 116 is provided with a platform 126 mounted on a plurality of toggle arm members 128 and 130 normally urged by a spring mechanism (not shown) to raise the platform 126 to the uppermost position shown in Figure 3 so that it firmly abuts the base of the opaque light box 26. This platform is adapted to have a book or like object placed thereon when it is in a lowered position, its movement being controlled by a handle member 132 projecting outwardly into a position of accessibility to the operator. When the handle member 132 is released, the platform will move upwardly and press the book or other object snugly against the bottom of the opaque light box and the opening 56 therein.

The front end of the base member 116 may be provided with bosses 134 and 136 on each side thereof having suitable vertical bores therein adapted to receive the lift tube members 138 and 140 and associated rods (not shown) so that the projector may be tilted when desired to raise the image on the screen, or to project upwardly to an overhead screen. In their preferred form, the tube members 138 and 140 each includes a spring disposed at the upper end thereof which operates to normally tend to eject the rod downwardly therefrom. With the tubular portions disposed as shown in Figures 3 and 4, the rod members will be automatically ejected downwardly when the clamping screws 142 and 144 are loosened and the projector is tilted upwardly. With the projector held in the desired tilted position, these screws can be tightened and the projector will then be retained in that position.

A pointer in the form of a small tubular projector 145 may be pivotally mounted on one side of the projector as shown in Figure 3. This can be manipulated to place a bright spot of light at any desired point on the projected image.

As shown in Figure 5, a transparent light box 146 may be provided having a suitable boss 148 on each side of the upper front edge thereof, each adapted to receive one of the focus tubes 18 and 20, substantially in the same manner as the bosses 118 and 120 on the base member 116. Knurled knobs 140 are provided to secure the tubes 18 and 20 as shown. The light box 146 is provided with a window 147 in its upper surface, adapted to support the transparent object to be projected. An aspheric concave mirror 148 may be provided disposed in association with a suitable lamp 150 to reflect the light so as to form an image of the lamp in the lens 115. This aspheric concave mirror 148 is preferably designed to correct the spherical aberration. The light box also contains a blower 152 for cooling.

As shown in Figure 5, when using the transparent light box 146, the bellows 32 may be removed entirely since the amount of illumination is considerably greater than with the opaque light box. Likewise, although the lens in Figure 5 is shown in association with the vertical surface of the projection head, it is equally possible to utilize a lens disposed in association with the substantially horizontal side of the head in the same manner as the lens shown in Figure 1.

A multipurpose projector is thus provided by this invention which is adapted for use with three-dimensional opaque, substantially flat opaque and transparent objects. Likewise, a projector incorporating the invention has great versatility in that lenses of substantially any focal length can be utilized thus greatly expanding the utility of the device. Similarly, it is possible to utilize lenses of unusually large aperture with a projector such as is disclosed herein which is an added advantage.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. An optical instrument adapted to project the image of an object onto a screen comprising a base member adapted to support the object to be imaged, a source of artificial light in said base member adapted to illuminate the object to be imaged, a plurality of elongated support members removably secured to said base member, a projection head adjustably supported by said support members having two substantially normal adjacent sides, rack means secured to said support members, gear means attached to said projection head and adapted to co-operate with said rack means, means for operating said gear means so as to adjust said projection head with respect to said base member, an entrance opening and an exit opening in said substantially normal sides respectively, a reflector member in said projection head disposed so as to provide a nonlinear axis through said projection head, a lens member, a lens board adapted to adjustably support said lens, and means for removably securing said lens board to said projection head in association with a selected one of said openings as desired.

2. An optical instrument adapted to project the image of an object onto the screen comprising a base member adapted to support the object to be imaged, a source of artificial light in said base member adapted to illuminate the object to be imaged, a plurality of elongated support members removably secured to said base member, a projection head adjustably supported by said support members having two substantially adjacent sides, rack means secured to said support members, gear means attached to said projection head and adapted to co-operate with said rack means, means for operating said gear means so as to adjust said projection head with respect to said base member, an entrance opening and an exit opening in substantially normal sides respectively, a reflector member in said projection head disposed so as to provide a nonlinear optical axis through said housing member, means for adjusting said reflector member whereby said nonlinear optical axis may be varied, a lens member, a lens board adapted to adjustably support said lens, and means for securing said lens board to said projection head in association with a selected one of said openings as desired.

3. An optical instrument adapted to project the image of an object onto a screen comprising a transparent member adapted to support the object to be imaged, a base member, a source of artificial light in said base member, an aspheric concave reflector adapted to correct spherical aberration for directing light from said artificial light through said transparent member, a projection head adjustably supported by said support member having two substantially normal adjacent sides, an entrance opening and an exit opening in said substantially normal sides respectively, a reflector member in said projection head disposed so as to provide a nonlinear optical axis through said projection head, a lens member, a lens board adapted to adjustably support said lens, and means for removably securing said lens board to said projection head in association with a selected one of said openings as desired.

4. An optical instrument adapted to project the image of an object onto a screen comprising a transparent member adapted to support an object to be imaged, a base member, a source of artificial light in said base member, an aspheric concave reflector adapted to correct spherical aberration for directing light from said artificial light through said transparent member, a plurality of elongated support members removably secured to said base member, a projection head adjustably supported by said support members having two substantially normal adjacent sides, rack means secured to said support members, gear means attached to said projection head and adapted to co-operate with said rack means, means for operating said gear means so as to adjust said projection head with respect to said base member, an entrance opening and an exit opening in said substantially normal sides respectively, said entrance opening being associated with said transparent member, a reflector member in said housing disposed so as to provide a nonlinear optical axis through said housing member, a lens member, a lens board adapted to adjustably support said lens, and means for removably securing said lens board to said projection head in association with a selected one of said openings as desired.

References Cited in the file of this patent

UNITED STATES PATENTS

| 908,560 | Goodrich | Jan. 5, 1909 |
| 1,895,654 | Forrest | Jan. 31, 1933 |
| 2,486,849 | Huebner | Nov. 1, 1949 |
| 2,596,393 | Fitzgerald | May 13, 1952 |
| 2,699,704 | Fitzgerald | Jan. 18, 1955 |
| 2,725,800 | Dewhurst | Dec. 6, 1955 |

FOREIGN PATENTS

| 921,596 | Germany | Dec. 23, 1954 |